(12) United States Patent
Kumar et al.

(10) Patent No.: US 8,107,386 B2
(45) Date of Patent: Jan. 31, 2012

(54) VPLS N-PE REDUNDANCY USING PSEUDO WIRE FAST FAILOVER

(75) Inventors: Rakesh Kumar, Austin, TX (US); Jay Shah, Austin, TX (US); Jason Xiaoguang Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 410 days.

(21) Appl. No.: 12/027,725

(22) Filed: Feb. 7, 2008

(65) Prior Publication Data

US 2009/0201831 A1    Aug. 13, 2009

(51) Int. Cl.
*H04J 1/16*    (2006.01)

(52) U.S. Cl. .................................................. 370/252

(58) Field of Classification Search .............. 370/252, 370/216, 228, 218, 231, 242, 256, 392, 248, 370/389, 401, 463, 253, 244, 250, 346, 395.53, 370/395.7, 246
See application file for complete search history.

(56) References Cited

U.S. PATENT DOCUMENTS

| | | | |
|---|---|---|---|
| 7,619,966 B2 * | 11/2009 | Lee | 370/218 |
| 7,660,303 B2 * | 2/2010 | Solomon et al. | 370/389 |
| 2007/0086448 A1 * | 4/2007 | Hu | 370/389 |

* cited by examiner

*Primary Examiner* — Chi Pham
*Assistant Examiner* — Alexander Boakye
(74) *Attorney, Agent, or Firm* — Schwegman, Lundberg & Woessner, P.A.

(57) ABSTRACT

In one example embodiment, a system and method is provided that includes establishing a plurality of Pseudo Wire (PW) connections between a first network appliance region and a second network appliance region to transmit data from the first network appliance region to the second network appliance region along an active PW. Further, the method includes disabling the active PW when a failure of the active PW is detected. Additionally, the method may include selecting an inactive PW to become a new active PW such that the data may be transmitted from the first network appliance region to the second network appliance region. Moreover, the method includes switching from the active PW to the new active PW.

20 Claims, 13 Drawing Sheets

VPLS N-PE REDUNDANCY USING PSEUDO WIRE FAST FAILOVER

FIELD

This application relates to a system and method for utilizing connections among network appliances.

BACKGROUND

Systems and methods implemented in a Virtual Private Local Area Network Service (VPLS) environment may utilize Pseudo Wire (PW) connections among one or more network appliances (e.g., a router, switch, bridge or other suitable device, collectively referenced as apparatus) to transmit data among these network appliances. A PW may be logical connection between two or more network appliances. Further, a PW may be an emulation of a native service over a Packet Switched Network (PSN). A PSN may be an Internet Protocol (IP) based network, X.25 based network, frame relay, Asynchronous Transfer Mode (ATM), or some other suitable network. In terms of network architecture, these PW connections may connect two or more network appliances in the form of Provider Edge (PE) appliances. These PEs appliances may be connected to one or more network appliances in the form of Customer Edge (CE) appliances. In certain example cases, PEs appliances may discover each other though implementing protocols such as the Border Gateway Protocol (BGP). VPLS allows for ethernet-based multipoint to multipoint communication over geographically dispersed locations (e.g., sites), wherein these locations are connected via PWs.

BRIEF DESCRIPTION OF DRAWINGS

The presently shown system and method is illustrated by way of example and not limitation in the figures of the accompanying drawings, in which like references indicate similar elements and in which.

DESCRIPTION OF EXAMPLE EMBODIMENTS

Figure 1:
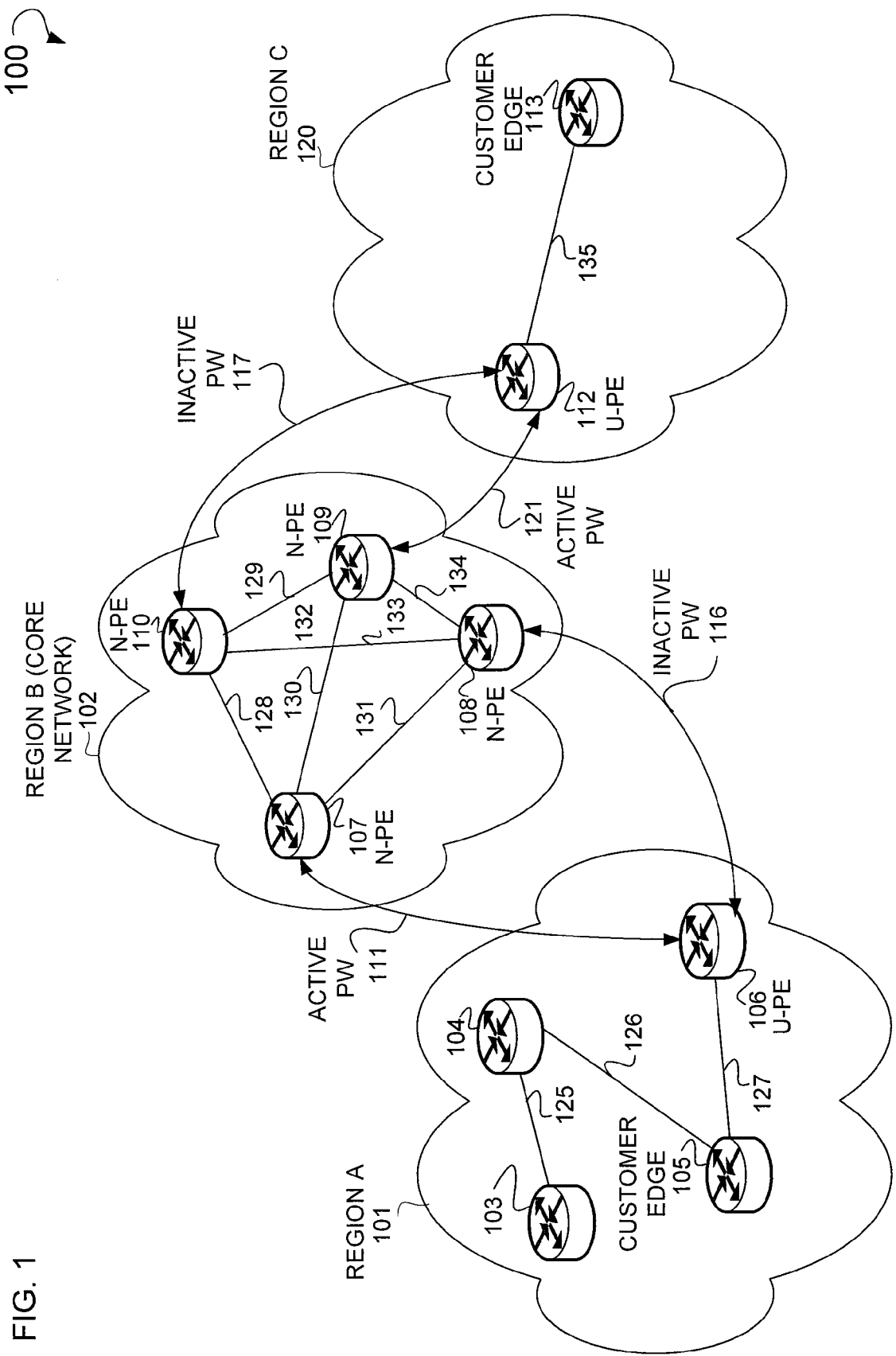
FIG. 1 is a diagram of a system, according to an example embodiment, illustrating a VPLS system.

In the following description, for purposes of explanation, numerous specific details are set forth in order to provide a thorough understanding of an embodiment of the present invention. It may be evident, however, to one skilled in the art that the present invention may be practiced without these specific details.

Overview

In one embodiment, a system and method are provided as including establish a plurality of PW connections between a first network appliance region and a second network appliance region to transmit data from the first network appliance region to the second network appliance region along an active PW. Further, the method includes disabling the active PW when a failure of the active PW is detected. Additionally, the method may include selecting an inactive PW to become a new active PW such that the data may be transmitted from the first network appliance region to the second network appliance region. Moreover, the method includes switching from the active PW to the new active PW.

In some example embodiments, a method is shown that includes determining an existence of flooding across an inactive PW connecting a first network appliance and a second network appliance. Further, this method may also include transmitting across an active PW a disable signal identifying the inactive PW.

DESCRIPTION OF EXAMPLE EMBODIMENTS

In some example embodiments, an apparatus and method for PW fast failover are shown. This apparatus may be a network appliance, and the method a computer implemented method. Further, the computer implemented method and network appliance illustrated herein may be implemented on a U-PE, N-PE, or plurality or U-PEs and N-PEs.

In some example embodiments, as illustrated herein, a VPLS-domain Layer-2 (L2) network within the Hierarchical-VPLS (H-VPLS) network between the U-PE and N-PE is shown as inherently loop-free. The term "between," as used herein may include various physically or logically defined paths that may or may not include other network appliances. Additionally, the term "between" may denote a bi-directional flow. This loop-free nature is ensured by having a single active L2-connection per-VPLS domain (e.g., a single active PW) between the VPLS-bridges at the U-PE and N-PE. Moreover, the VPLS-domain illustrated herein may have more than one established PWs between a U-PE and more than one N-PEs in the H-VPLS network. Some example embodiments may have pseudo traffic understood as a uniquely identifiable test traffic that would cause L2 flooding in the L2-network in which the pseudo traffic is injected. In addition, in some example cases, PW flooding may be understood as that part of normal L2 flooding within the VPLS-domain in an H-VPLS network that traverses the PW.

In some example embodiments, a system and method are illustrated for a mechanism to provide fast failover to a backup PW path after the failure of an initial PW path has been detected. In some example embodiments, a control plane is maintained to set up and control one or more PWs. Further, in some example embodiments, a data plane is maintained to actually transmit data over one or more PWs between, for example, a U-PE, and an N-PE. Some example embodiments may include a U-PE and an N-PE, wherein the U-PE and N-PE are one or more type of network appliances.

Some example embodiments may include a U-PE that signals an active PW as well as all backup PW paths to one or more remote N-PEs. In one embodiment, only the U-PE is configured to recognize that one of the established PWs is active and the rest are backups. This may occur when the PWs are initially configured. Once the PWs are established, the U-PE activates the active PW in the data plane and disables all back-up PWs in the data plane. In some example embodiments, disabling a PW in a data plane may include preventing the in-band transmit and receive operations over the PW.

In some example embodiments, the N-PEs are configured in such a manner that they are unaware of active and backup PWs and, in effect, enable all PWs in the control plane and data plane. This may be referred to as unilateral PW disabling, whereby the U-PE unilaterally disables a PW in the data plane without similar support from the N-PE. The U-PE can disable the PW in the data plane using a number of mechanisms that can be implemented in a platform-dependent way.

In some example embodiments, when the active PW path goes down (e.g., is detected using a PW failure detection mechanism), the U-PE can immediately enable one of the backup PW paths (which are selected during configuration) and start forwarding traffic over the backup PW path with little or no signalling between the U-PE and N-PE. This may be done at the U-PE in interrupt context, enabling PW switchover. In some example embodiments, an Media Access Control (MAC) address convergence after switchover mechanism may be utilized so as to improve network convergence.

In some example embodiments, the same PW switchover mechanism may allow the formerly active PW path to be reused. For example, when the formerly active PW path comes back up as a new active PW, and a determination has been made to switch back to that path (e.g., through configuration), the PW switchover mechanism may be used. If the new active PW fails and the formerly active PW path is used, then the same PW switchover mechanism may be used.

In some example embodiments, the PW switchover mechanism for switching over to or otherwise utilizing a new PW path may be shown as follows. The current active PW is disabled in the data plane (e.g., if the current active PW is up and active). The new active PW is enabled in the data plane. By first disabling the currently active PW, a looping problem may be avoided.

In some example embodiments, PW flooding (e.g., back flooding) may occur. In some examples, when the active and backup PWs are enabled via the control plane, and the backup PWs are disabled by the U-PE in the data plane, the backup PWs are not disabled in the data plane by the N-PE. The N-PE may continue to broadcast data over the backup PWs because the N-PE does not know which PWs are active (e.g., enabled). One result of not disabling the PWs is unnecessary flooding over the backup-PWs from the N-PEs to the U-PE. In some example embodiments, a bilateral PW disabling mechanism is implemented to allow one end of a PW to signal another end of the PW to disable the PW in the data plane. When the U-PE determines a PW to be disabled in the data plane, the U-PE can send a bilateral PW disabling signal to the remote N-PE to do the same. Similarly, when the U-PE determines a PW to be enabled in the data plane, the U-PE can send a Bilateral PW Enabling Signal to the remote N-PE to enable the PW in the data plane. This may ensure that the N-PE PW state tracks the U-PE PW state, eliminating unnecessary flooding over the backup PW. In some example embodiments, to facilitate fast failover the bilateral PW enabling, or disabling signal is generated in-band to the PW. This may be accomplished via an enhancement to the PW control word (e.g., a specific binary value or ASCII-based term) to carry a signal for bilateral PW disabling.

FIG. 1 is a diagram of an example system 100 illustrating a VPLS system. Illustrated are a number of network appliances operatively connected via a plurality of PWs. Each of these network appliances reside in any one of a number of regions (e.g., network appliance regions). A region can be a domain, area or an Autonomous System (AS). Here, a region A 101 includes network appliances 103, 104, a CE 105, and a U-PE 106. Also shown is a region B 102 that contains N-PEs 107-110. Further, a region C 120 is shown that contains U-PE 112, and CE 113. Also illustrated is a plurality of connections 125-135.

In some example embodiments, the various network devices within these regions may be operatively connected to one another. For example, region A 101 contains the network appliance 103 operatively connected to the network appliance 104. This network appliance 104 is, in turn, connected to CE 105. The CE 105 is operatively connected to the U-PE 106.

In some example embodiments, the U-PE 106 is operatively connected to network appliances in the form of an N-PE 107 and an N-PE 108. The connection between U-PE 106 and N-PE 107 is via an active PW 111. The connection between U-PE 106 and N-PE 108 is via an inactive PW 116. This N-PE 107 may, in some example networks, reside as part of a region B 102, where region B 102 is a core network. Also residing as part of this region B 102 may be any one of a number of additional network appliances including additional N-PEs such as N-PEs 108-110. These additional network appliances may be operatively connected to N-PE 107 and 108 via one or more connections. Illustrated is an N-PE 109 and 110, each of which has a connection to N-PE 107 and 108.

In some example embodiments, N-PE 110 and 109 are connected via a PW to another region C 120. Residing within this region C 120 is a plurality of additional network appliances. For example, N-PE 109 is operatively connected to U-PE 112 via an active PW 121. Additionally, N-PE 110 is operatively connected to the U-PE 112 via an inactive PW 117. This U-PE 112 resides in region C 120 with a CE 113. This CE 113 is operatively connected to the U-PE 112 via a physical connection.

Figure 2:
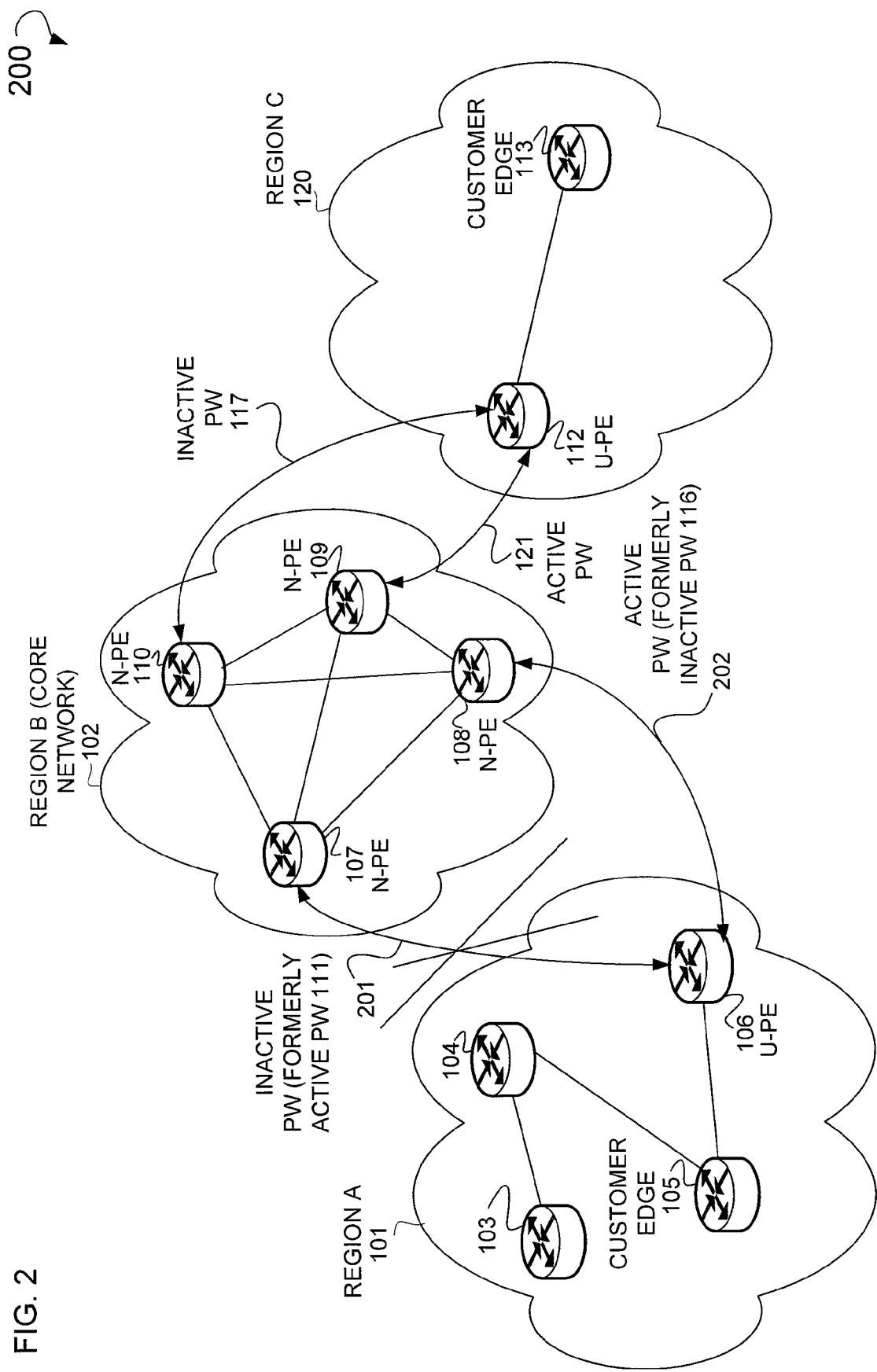
FIG. 2 is a diagram of a system, according to an example embodiment, illustrating a VPLS where a switchover from one PW to another PW takes place.

FIG. 2 is a diagram of an example system 200 illustrating a VPLS system where a switchover (e.g., failover) from one PW to another PW takes place. Shown is an inactive PW 201 that is the formerly active PW 111. Also shown is an active PW 202 (e.g., a new active PW) that is the formerly inactive PW 116. In some example embodiments, where the formerly active PW 111 fails, the formerly inactive PW 116 becomes an active PW 202, and the formerly active PW 111 becomes an inactive PW 201. The selection of an inactive PW to become an active PW may be made on the basis of a negotiation between a U-PE and N-PE, or even via some type of manual configuration. Once the failover occurs, and the active PW becomes an inactive PW, the formerly active PW is stored into a data structure for future use.

Figure 3:
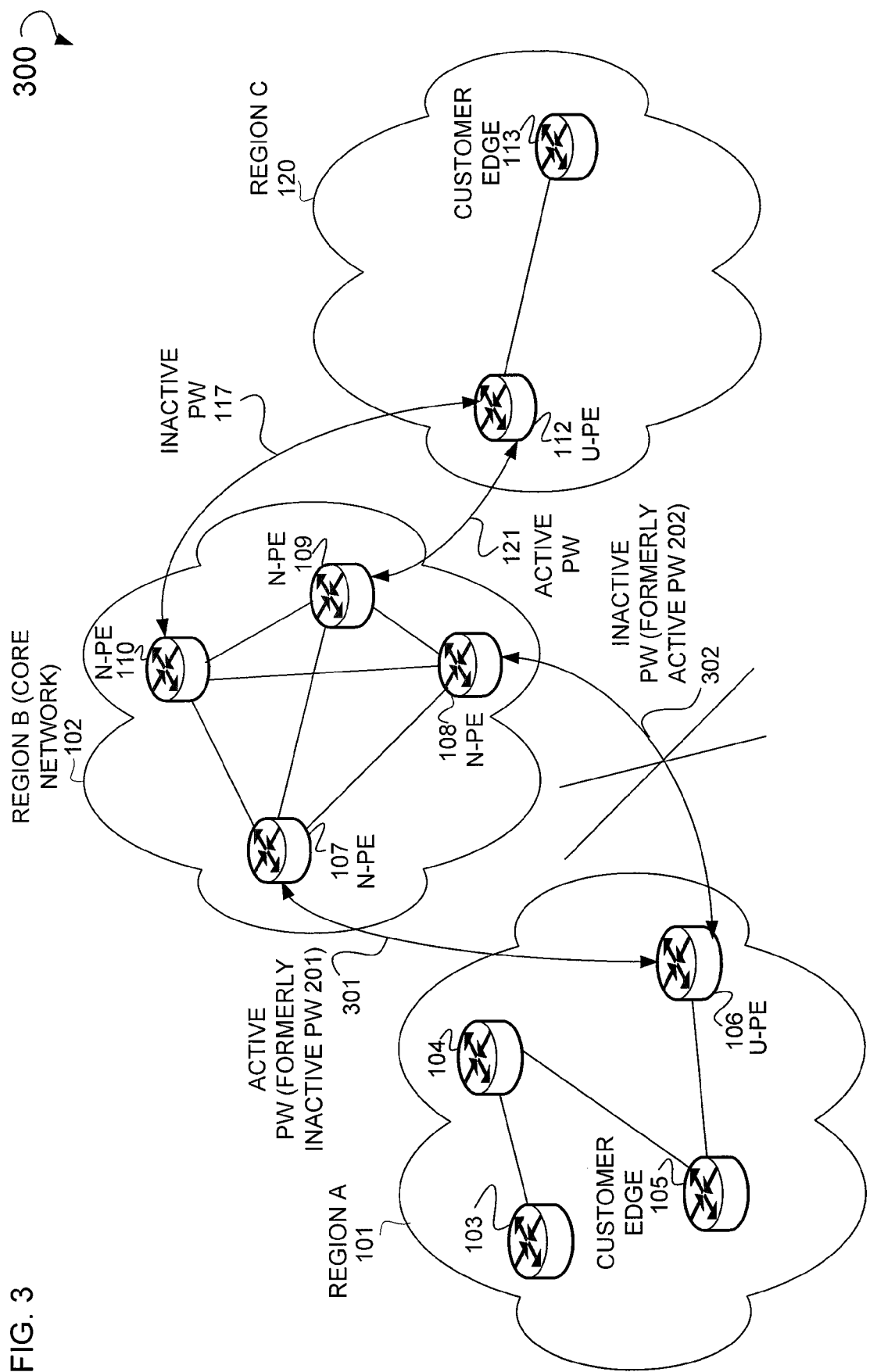
FIG. 3 is a diagram of a VPLS system, according to an example embodiment, where a switchover occurs from an active PW to a formerly active PW.

FIG. 3 is a diagram of an example VPLS system 300 where a switchover (e.g., failover) occurs from an active PW to a formerly active PW. Shown is a VPLS system 300 wherein various PWs become inactive and other PWs become active. For example, illustrated is an inactive PW 302 that was the formerly active PW 202. Also shown is an active PW 301 (e.g., a new active PW) that is the formerly inactive PW 201. This figure reflects the concept that, in some example embodiments, a formerly active PW (e.g., actively PW 111) can become inactive (e.g., inactive PW 201) when failure occurs, and then becomes an active PW (e.g., as active PW 301) once again when the PW comes back up.

Figure 4:
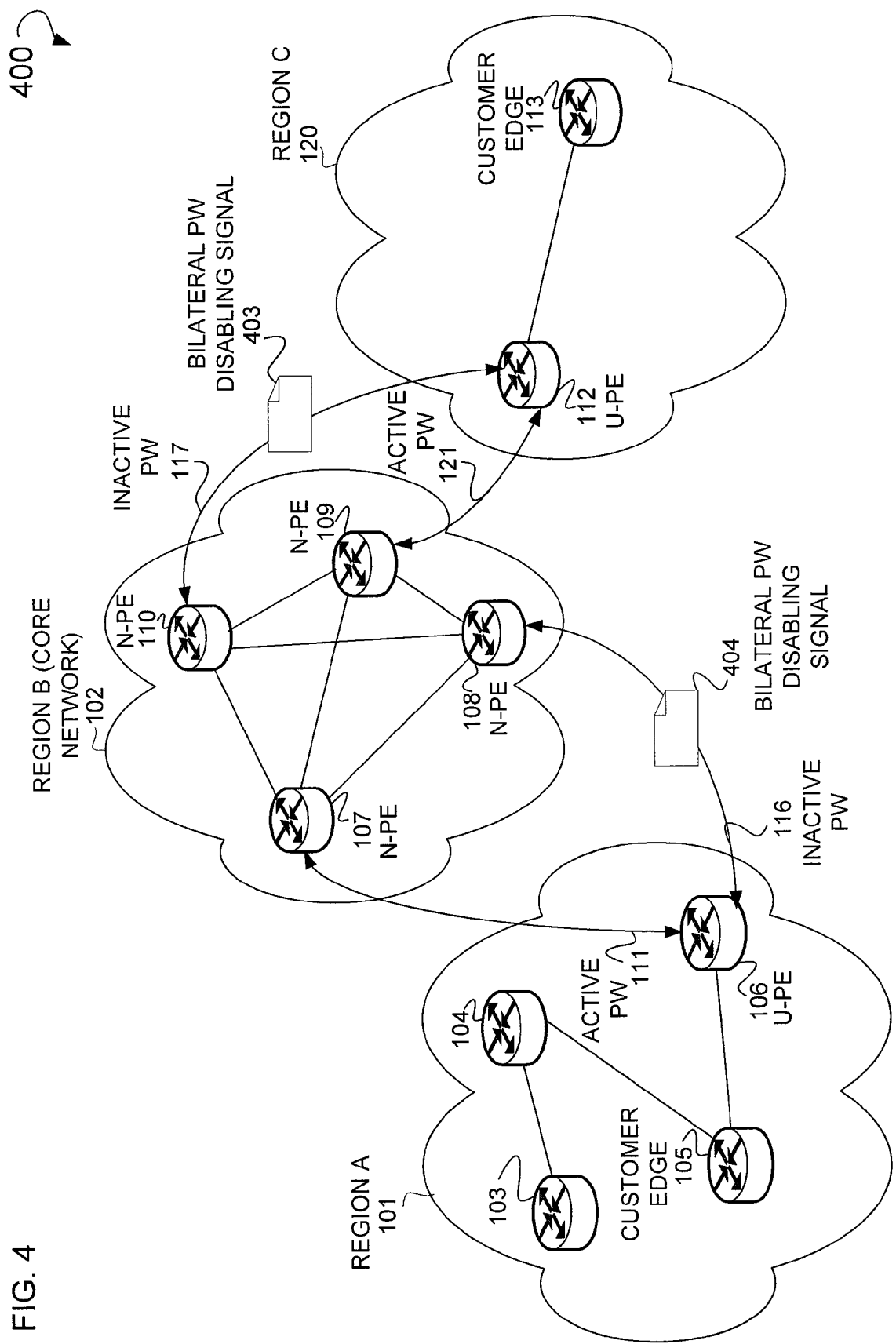
FIG. 4 is a diagram of a VPLS system, according to an example embodiment, illustrating the problem of a PW flooding over an inactive PW, and a proposed solution.

FIG. 4 is a diagram of an example VPLS system 400 illustrating the problem of PW flooding from the N-PE to the U-PE over the inactive PW. Shown is the U-PE 106 operatively connected to the N-PE 107 via an active PW 111 and inactive PW 116. Further, the N-PE 110 is operatively connected to a U-PE 112 via the inactive PW 117, and the N-PE 109 is operatively connected to the U-PE 112 via the active PW 121. In some example embodiments, a PW flood may be transmitted back across the inactive PW by an N-PE. Here, for example, shown is a bilateral PW disabling signal 404 that is transmitted across the inactive PW 116. Similarly, a bilateral PW disabling signal 403 is transmitted back across the inactive PW 117 by the N-PE 110 to the U-PE 112. In one example embodiment, the transmission of a PW flood is the result of the N-PE (e.g., N-PEs 108 and 110) not being configured to analyze which PWs are active or inactive.

In some example embodiments, where a U-PE node is in a steady state, and failover needs to occur to switch from one PW to another PW, unilateral PW disabling may be facilitated. This unilateral PW disabling may be facilitated through establishing back-up PWs in a control plane through a deterministically targeted-LDP control plane. Additionally, unilateral PW disabling may be facilitated by checking the flooding of traffic over the backup (inactive) PWs from the U-PE to the N-PEs at the U-PE, and ensuring that the flooded traffic is not forwarded by the U-PE into the PW towards the N-PEs. Further, unilateral PW disabling may be facilitated by checking the flooding of traffic over the backup (inactive) PWs from the N-PEs to the U-PE at the U-PE and ensuring flooded traffic is not forwarded by the U-PE into the customer's VPLS service instance.

In some example embodiments, ensuring that looping does not occur may imply that in-band communication over the back-up PWs is disabled at the U-PE. Further, another way to deterministically check for flooding may be to inject traffic into the inactive PWs towards the U-PE. This traffic may be injected at some point in-between the U-PE and N-PE to ensure the traffic is not forwarded by the U-PE into the customer's VPLS service instance.

Further, in some example embodiments, after failover, the actual switching from an active to inactive PW may be facilitated through changing the U-PE, from an active U-PE-to-N-PE PW to backup (e.g., formerly inactive PW) U-PE-to-N-PE PW in a Hierarchical Virtual Private LAN Services (H-VPLS) network. Once this change occurs, no additional Label Distribution Protocol (LDP) control message may be sent for the backup PW during switchover, or for re-establishment of a steady state after switchover.

In some example embodiments, bilateral PW disabling may be facilitated via a U-PE in a steady state through deterministically checking that the back-up PWs are established in the control plane. One of the examples that bilateral PW disabling may be facilitated is through targeted LDP control packet inspection, checking to determine that no traffic flooding occurs over the backup PWs from the U-PE to the N-PEs, or from the N-PEs to the U-PE. Another example of bilateral PW disabling may be facilitated is through deterministically checking whether in-band communication over the back-up PWs is disabled at the U-PE. For example, this checking may be facilitated by directing traffic into the backup PWs towards the U-PE, from some point in between the U-PE and N-PE, and ensuring the traffic is not forwarded by the U-PE into the customer's VPLS service instance. Yet another example for determining bilateral PW disabling may be through deterministically checking whether in-band communication over the back-up PWs is disabled at the N-PE. This may be performed by directing traffic into the backup PWs towards the N-PE, from some point in between the U-PE and N-PE, and ensuring the traffic is not forwarded by the N-PE into the VPLS core.

In some example embodiments, the failure of an active PW may be verified by any one of the following methods. For example, a fast (e.g., sub second) switchover, initiated at the U-PE, from active U-PE-to-N-PE PW to backup U-PE-to-N-PE PW in a H-VPLS network such that no additional targeted LDP control message is sent for the backup-PW during switchover. Alternatively, the re-establishment of steady state after switchover may be utilized as a method to verify an active PW.

Figure 5:
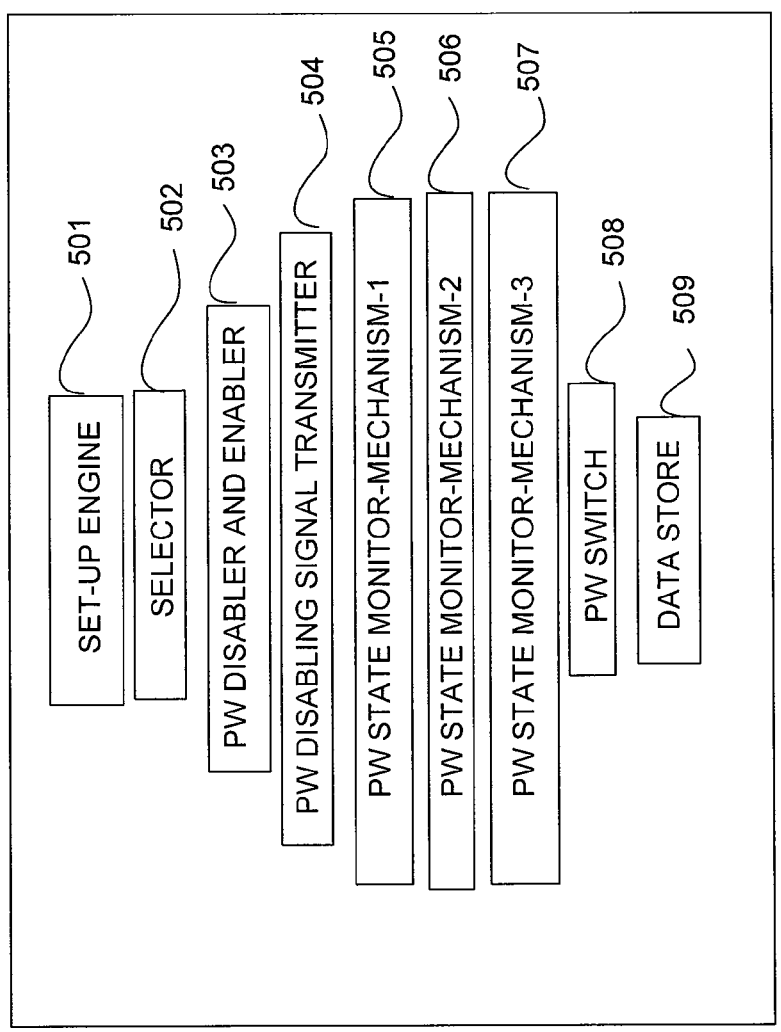
FIG. 5 is a block diagram of a network appliance, according to an example embodiment, wherein this network appliance may be, for example, a User Side-Provider Edge (U-PE).

FIG. 5 is a block diagram of a network appliance 500, wherein this network appliance 500 may be, for example, the U-PE 106. In certain examples, these blocks might be implemented on an N-PE. The various blocks shown herein may be implemented in hardware, firmware, or software. Network appliance 500 may include a set-up engine 501, selector 502, PW disabler and enabler 503, PW disabling signal transmitter 504, PW state monitor-mechanism-1 505, PW state monitor-mechanism-2 506, PW state monitor-mechanism-3 507, PW switch 507, and data store 509. Illustrated is a set-up engine 501 that, in some example embodiments, is used to establish PW connections between a first network appliance region and a second network appliance region, and to transmit data between a first network appliance and a second network appliance along an active PW. The set-up engine 501 may be any software, firmware, or hardware module that initiates the establishment of a PW connection. A selector 502 is also shown that, in some example embodiments, allows for the selection of a PW connection for use as an active PW. The selector 501 may be any software, firmware, or hardware module that allows for the selection of a PW connection. A PW disabler and enabler 503 are shown that may be used to control the state of the PW in data-plane. The PW disabler and enabler 503 may be any software, firmware, or hardware module used to control the state of the PW in data-plane. A PW Disabling Signal Transmitter 504 may be a hardware, software, or firmware module used to transmit a PW Disable signal to convey the identity of the inactive PW to the remote-end, so that the remote end could also disable the PW in data-plane. In some example cases, a PW state monitor-mechanism-1 505 is implemented in hardware, software, or firmware to monitor the active PW using a protocol like Bi-directional Forwarding Detection. A further PW state monitor-mechanism-2 506 is implemented in hardware, software, or firmware to monitor the active PW by monitoring activity on the active PW. Moreover, in some example cases, a PW state monitor-mechanism-3 507 is implemented in hardware, software, or firmware to monitor the active PW by polling the second network appliance, and detecting a response to the polling. Further, a PW switch 508 may be implemented in hardware, firmware, or software to switch from an active PW to inactive PW. Additionally, a data store 509 may be implemented to store the inactive PW, along with other inactive PW.

Figure 6:
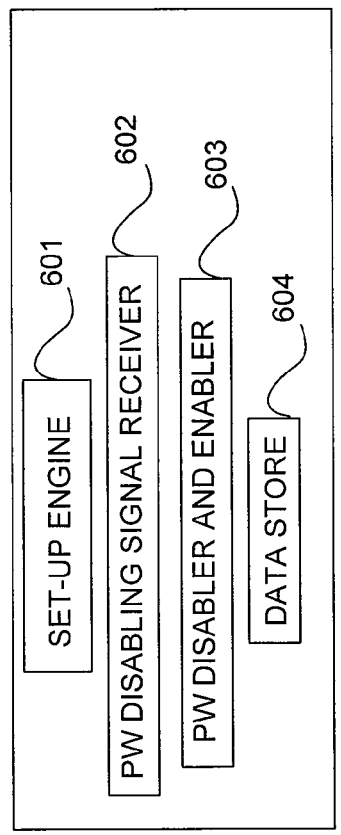
FIG. 6 is a block diagram of a network appliance, according to an example embodiment, wherein this network appliance may be an Network Side-Provider Edge (N-PE).

FIG. 6 is a block diagram of a network appliance 600, wherein this network appliance 600 may be, for example, the N-PE 107. Network appliance 600 may include set-up engine 601, PW disabling signal receiver 602, PW disabler and enabler 603, and data store 604. In certain example cases, these blocks might be implemented on a U-PE. The various blocks shown here in may be implemented in hardware, firmware, or software. Illustrated is a set-up engine 601 implemented in hardware, software, or firmware is used in the establishment of a plurality of PW connections between a first network appliance region and a second network appliance region, to transmit data between a first network appliance and a second network appliance along an active PW. Further, in some example embodiments, PW disabling signal receiver 602 is implemented in hardware, software, or firmware that receives a PW disabling signal. Further, a PW disabler and enabler 603 is implemented in hardware, software, or firmware that controls the state of the PW in data-plane based on the state of the PW disabling signal. A data store data store 604 is also shown that implemented in a persistent or non-persistent form.

Figure 7:
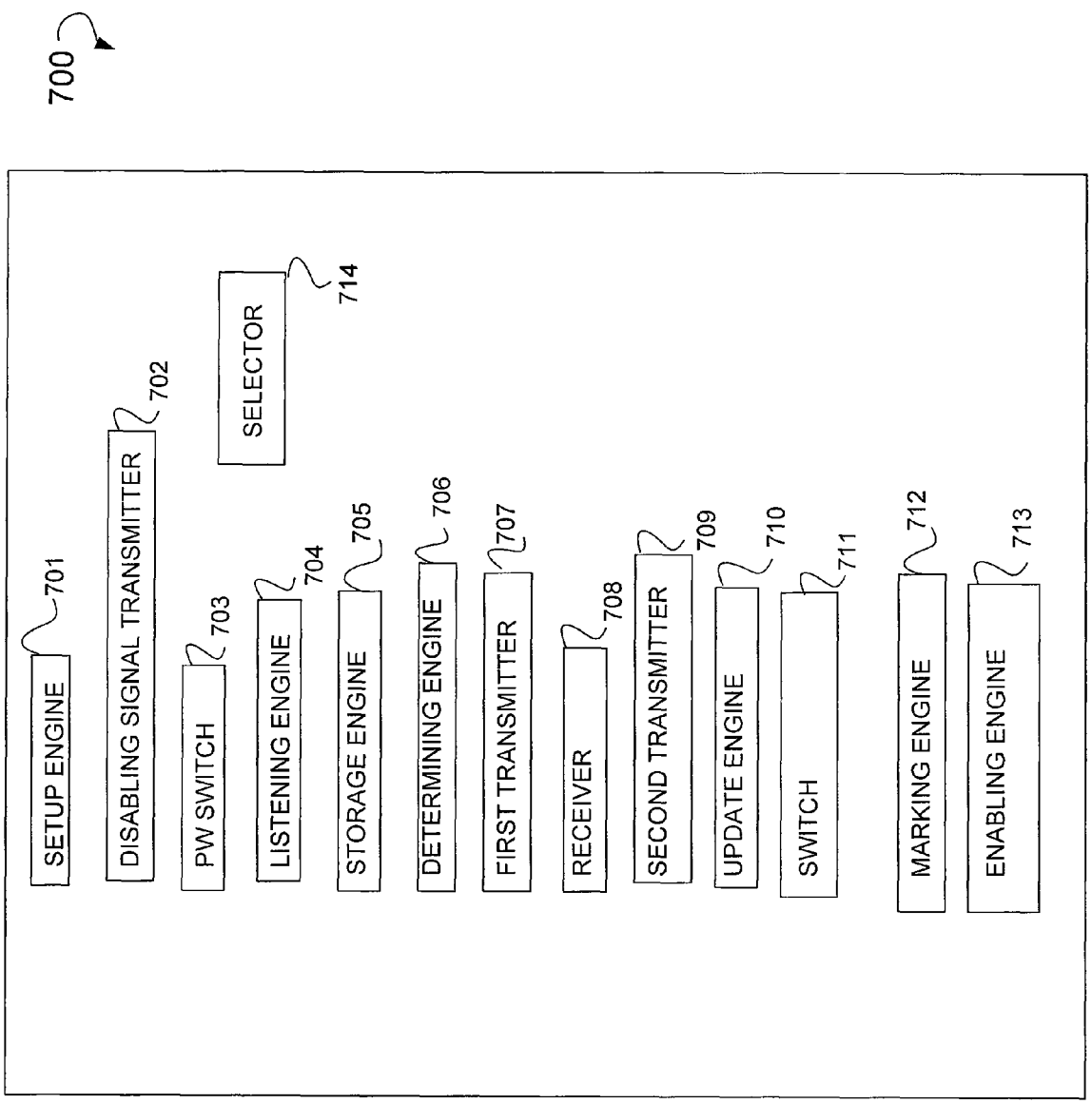
FIG. 7 is a block diagram of a network appliance, according to an example embodiment, configured as a U-PE.

FIG. 7 is a block diagram of a network appliance 700, wherein this network appliance 700 may be, for example, the U-PE 106. In certain example cases, these blocks might be implemented on an N-PE. The various blocks shown here in may be implemented in hardware, firmware, or software. Shown are the following blocks that include setup engine 701, disabling signal transmitter 702, a selector 714, PW switch 703, listening engine 704, storage engine 705, determining engine 706, first transmitter 707, receiver 708, second transmitter 709, update engine 710, switch 711, marking engine 712, and an enabling engine 713. A setup engine 701 is shown that establishes a plurality of PW connections between a first network appliance region and a second network appliance region to transmit data from the first network appliance region to the second network appliance region along an active PW. Further, a disabling signal transmitter 702 is shown to transmit a disable PW signal when a failure of the active PW is detected. Also illustrated is a selector 714 to select an inactive PW to become a new active PW such that the data may be transmitted from the first network appliance region to the second network appliance region. Moreover, a PW switch 703 is illustrated to switch from the active PW to the new active PW, the new active PW providing a new data plane across which the data may be transmitted. A listening engine 704 may be used to listen to the active PW. Listening may include detecting the existence of data transmissions on an active PW. In some example embodiments, the listening engine listens to the active PW, and monitors activity on the active PW. Some example embodiments may include the listening engine 704 listening to the active PW, polling the second network appliance, and detecting a response to the polling. A storage engine 705 may be executed to store the active PW into a data store as another inactive PW. In some example embodiments, the apparatus is part of a core network that includes at least one of the first network appliance region and the second network appliance region. In some example embodiments, a determining engine 706 is used to determine whether bilateral PW disabling is supported by at least one of the first network appliance or the second network appliance. Further, in certain example cases a first transmitter 707 is used to transmit a disable signal from the first network appliance to the second network appliance to instruct the second network appliance as to an identity of an inactive PW. Additionally, a receiver 708 may be used to receive a data transmission across an active PW, the data transmission being sent from the second network appliance to the first network appliance. Moreover, a second transmitter 709 is used to transmit a PW enable signal from the first network appliance to the second network appliance when the inactive PW is being transitioned to become the active PW. An update engine 710 may update the second network appliance on the identity of the inactive PW. A switch 711 may be used in the first network appliance to switch from a first active PW to a second active PW, the second active PW being formerly the inactive PW. A marking engine 712 may mark the inactive PW. An enabling engine 713 may enable a selected inactive PW in a data plane.

Figure 8:
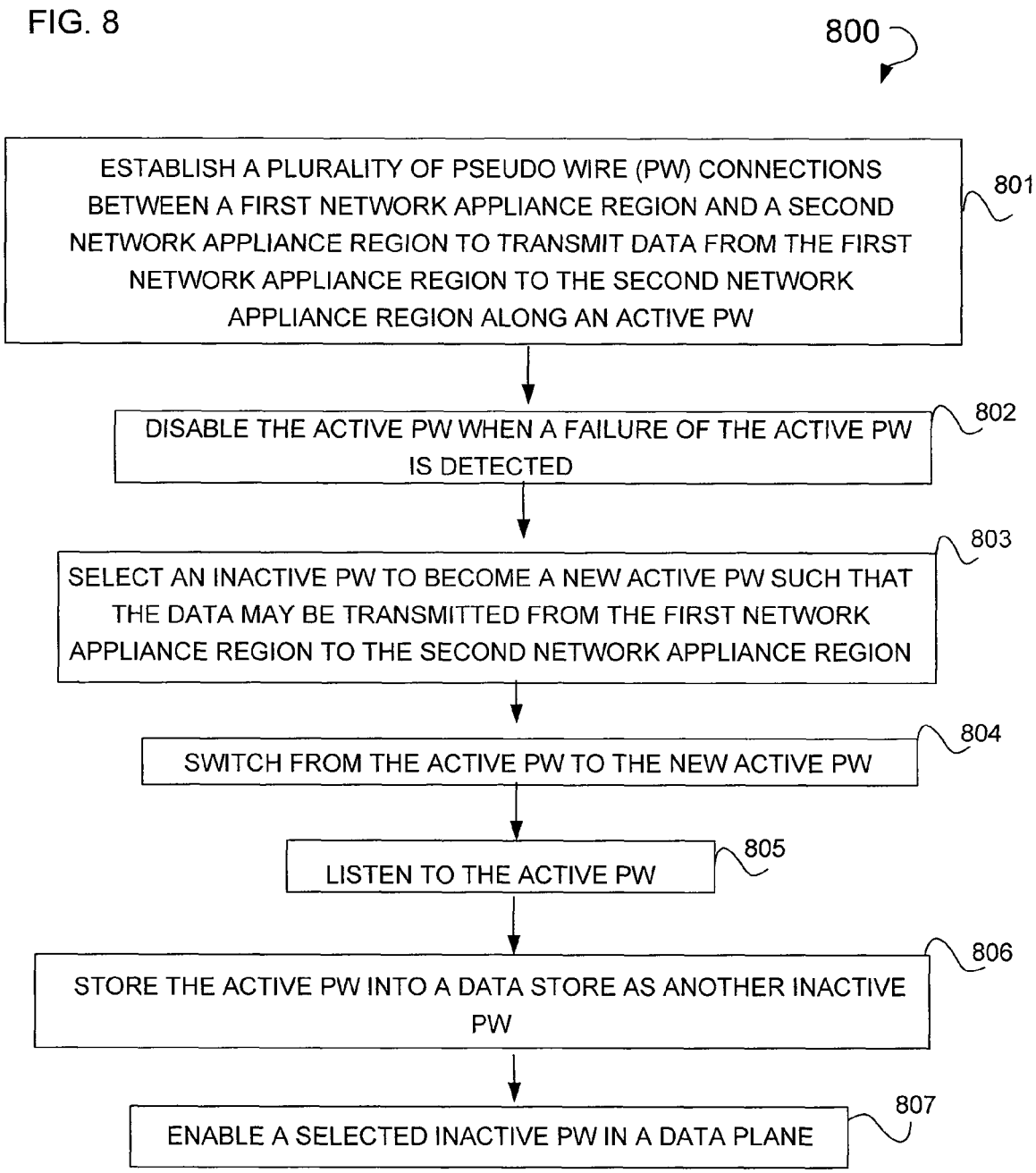
FIG. 8 is a flowchart illustrating a method, according to an example embodiment, used to switch from an active PW to an inactive PW.

FIG. 8 is a flow chart illustrating an example method 800 used to switch from an active PW to an inactive PW. Shown are various operations 801-807. In some example embodiments, an operation 801 is executed so as to establish a plurality of PW connections. This plurality of PW connections may be established between a first network appliance region and a second network appliance region to transmit data from the first network appliance region to the second network appliance region along an active PW. An operation 802 is executed to disable the active PW when a failure of the active PW is detected. Further, an operation 803 is execute to select an inactive PW to become a new active PW such that the data may be transmitted from the first network appliance region to the second network appliance region. Further, an operation 804 is executed to switch from the active PW to the new active PW. An operation 805 may be executed to listen to the active PW. In some example embodiments, through the execution of operation 805, polling of the second network appliance takes place and the detection of the response to the polling also occurs. An operation 806 may be executed to store the active PW into a data store as another inactive PW. Further, an operation 807 may be executed so as to enable a selected inactive PW in a data plane.

Figure 9:
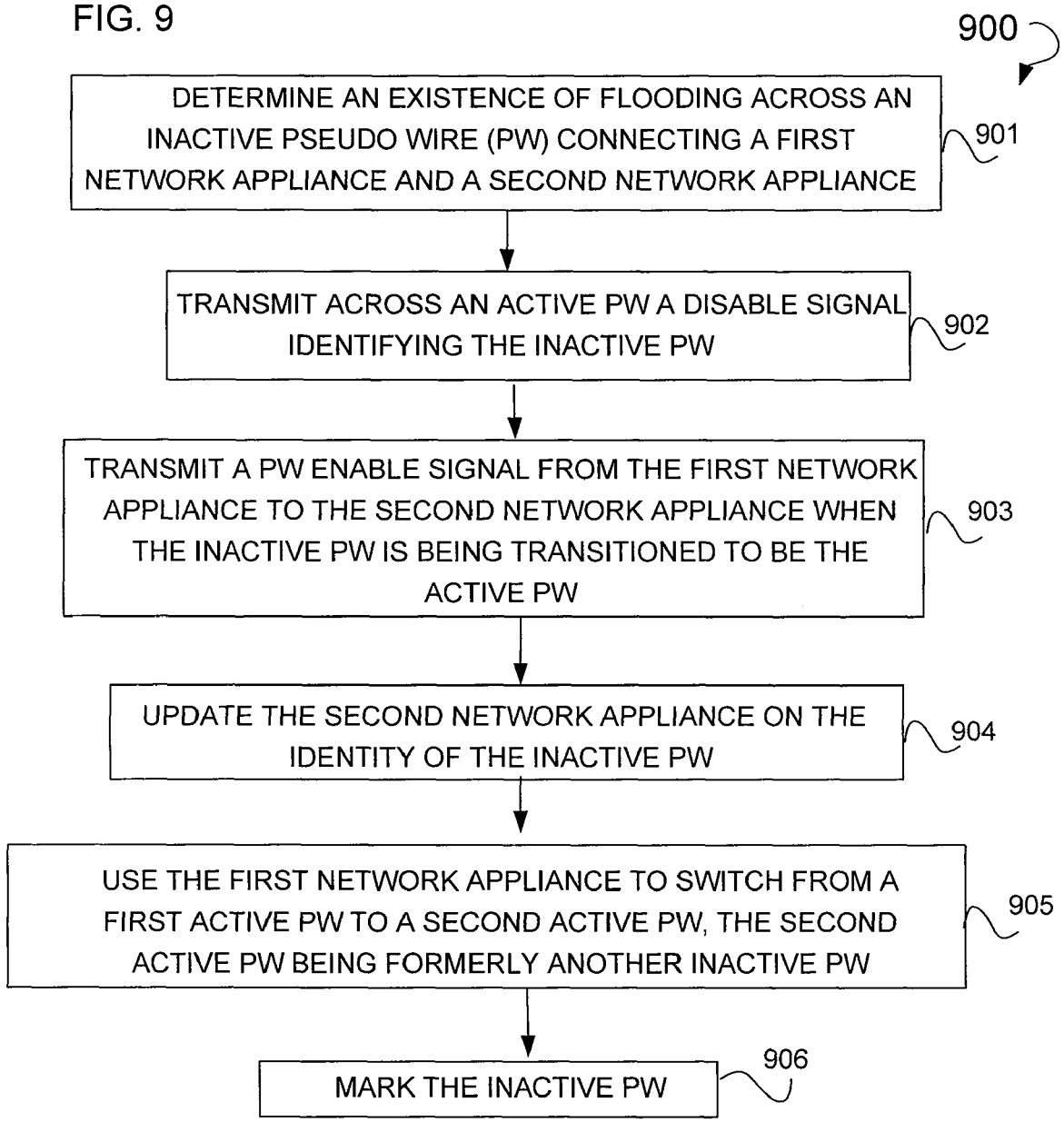
FIG. 9 is a flowchart illustrating a method, according to an example embodiment, used to instruct a network appliance as to active and inactive PWs.

FIG. 9 is a flow chart illustrating an example method 900 used to instruct a network appliance as to active and inactive PWs. Shown are various operations 901-906. An operation 901 is shown that when executed, the operation determines an existence of flooding across an inactive PW connecting a first network appliance and a second network appliance. An operation 902 is also shown that transmits across an active PW a disable signal identifying the inactive PW. Further, an operation 903 may be executed that transmits a PW enable signal from the first network appliance to the second network appliance when the inactive PW is being transitioned to be the active PW. Moreover, an operation 904 may be executed that updates the second network appliance on the identity of the inactive PW. Additionally, an operation 905 may be executed that uses the first network appliance to switch from a first active PW to a second active PW, the second active PW being formerly another inactive PW. An operation 906 may be executed that marks the inactive PW. These operations are more fully illustrated in FIG. 10 below.

Figure 10:
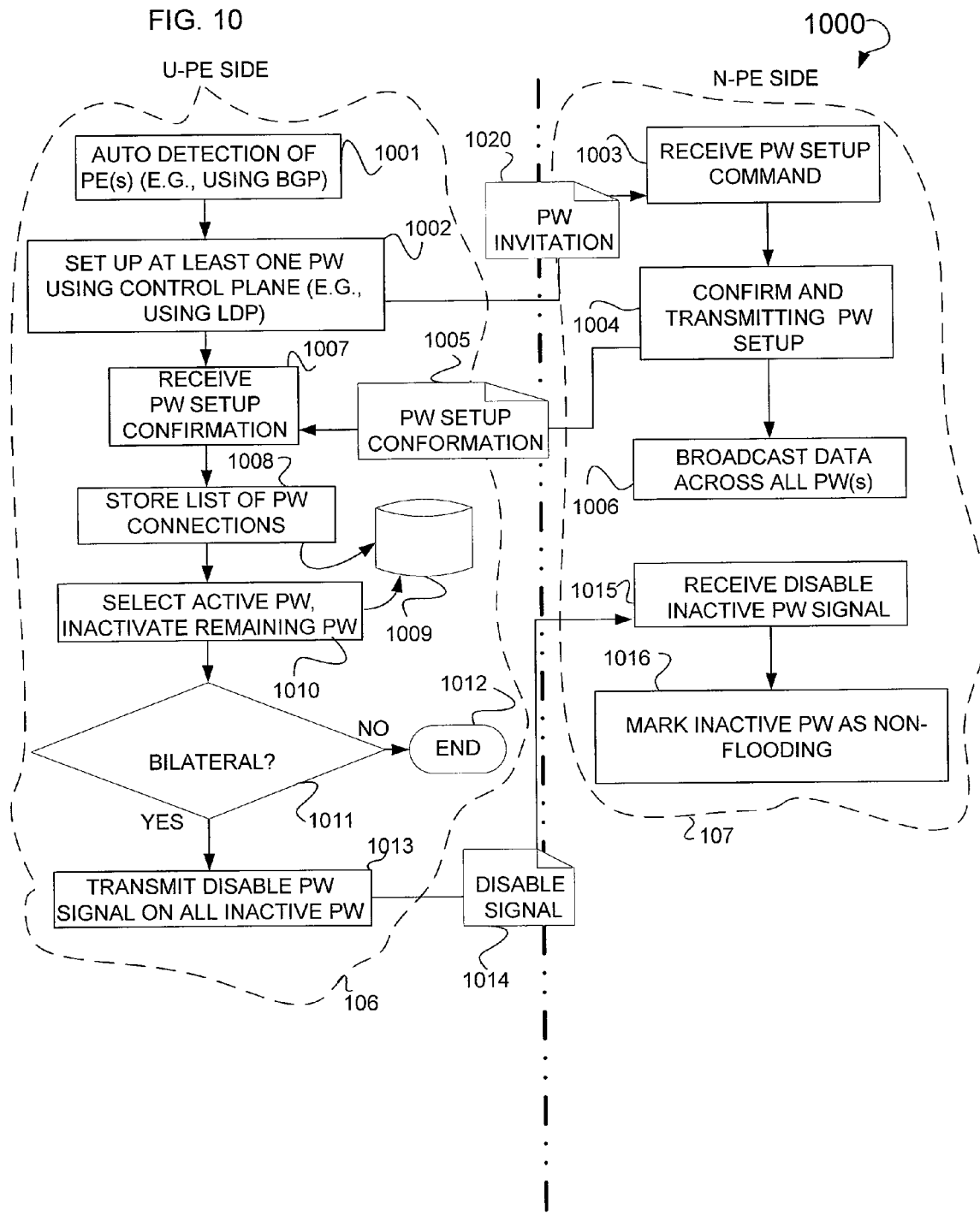
FIG. 10 is a dual-stream flowchart illustrating a method, according to an example embodiment, for setting up one or more PWs, transmitting data along these PWs, and addressing any issues of PW flood across inactive PWs.

FIG. 10 is a dual-stream flowchart illustrating a method 1000 for setting up one or more PWs, transmitting data along these PWs, and addressing any issues of PW flood across inactive PWs. Illustrated is a first stream titled "U-PE side," and a second stream titled "N-PE side." Starting with the U-PE side, a number of operations 1001-1002, 1007-1008, 1010-1011, and 1013, and a database 1009 are illustrated. These operations may reside as a part of, for example, the U-PE 106. With regard to the N-PE side, a number of operation 1003-1004, and 1006 are shown as residing as part of, for example, the N-PE 107.

Some example embodiments may include an operation 1001 that, when executed, auto-detects various PEs that may be connected to the N-PE 107. This auto detection may occur through using, for example, BGP. Through auto detection, a number of PWs may be created between a U-PE and an N-PE. Operation 1002 is executed to set up at least one PW using, for example, a control plane implementing, for example, LDP.

In some example embodiments, PW invitation is generated and sent from, for example, a U-PE, such as U-PE 106, to an N-PE such as N-PE 107. This invitation is received though the execution of an operation 1003 that receives a PW setup command. An operation 1004 may be executed that confirms and transmits a PW setup confirmation, such as PW setup confirmation 1005. This PW setup confirmation 1005 is received by the U-PE 106 through the execution of an operation 1007. Once operation 1007 is executed, and the PW setup confirmation 1005 is received, an operation 1008 is executed that stores a list of PW connections into, for example, a database 1009. This list of PW connections is stored into the database 1009, and an operation 1010 is executed that selects an active PW. In some example embodiments, the selection of an active PW may be based upon a random selection algorithm, an algorithm that takes into account certain bandwidth requirements and network appliance capabilities, or some other suitable algorithm. In some example embodiments, the selection of an active PW is performed as the result of some type or negotiation between a U-PE and an N-PE. Further, the selection of a PW may be based upon some type of manual configuration of the U-PE and N-PE. In some example cases, the reference information for the remaining inactive PWs are stored into the database 1009 through the execution of the operation 1010.

In some example embodiments, once an active PW is selected, all the inactive PWs are disabled in the data-plane at the U-PE. A decisional operation 1011 is executed to determine whether or not bi-lateral PW disabling is enabled. In example cases where decisional operation 1011 evaluates to no (e.g., "false"), a termination condition 1012 is executed and the process ends. In example cases where decisional operation 1011 evaluates to yes (e.g., "true"), an operation 1013 is executed. Operation 1013 may transmit a disable PW signal on all inactive PWs, such as disable signal 1014, from the U-PE 106 to the N-PE 107. An operation 1015 may then be executed that receives the disable inactive PW signal. An operation 1016 is executed that may mark inactive PWs within a routine table on the N-PE side (e.g., N-PE 107), so as to limit or prevent unnecessary flooding between the N-PE and U-PE across inactive PWs. This marking may be in the form of setting a flag value associated with each inactive PW.

Figure 11:
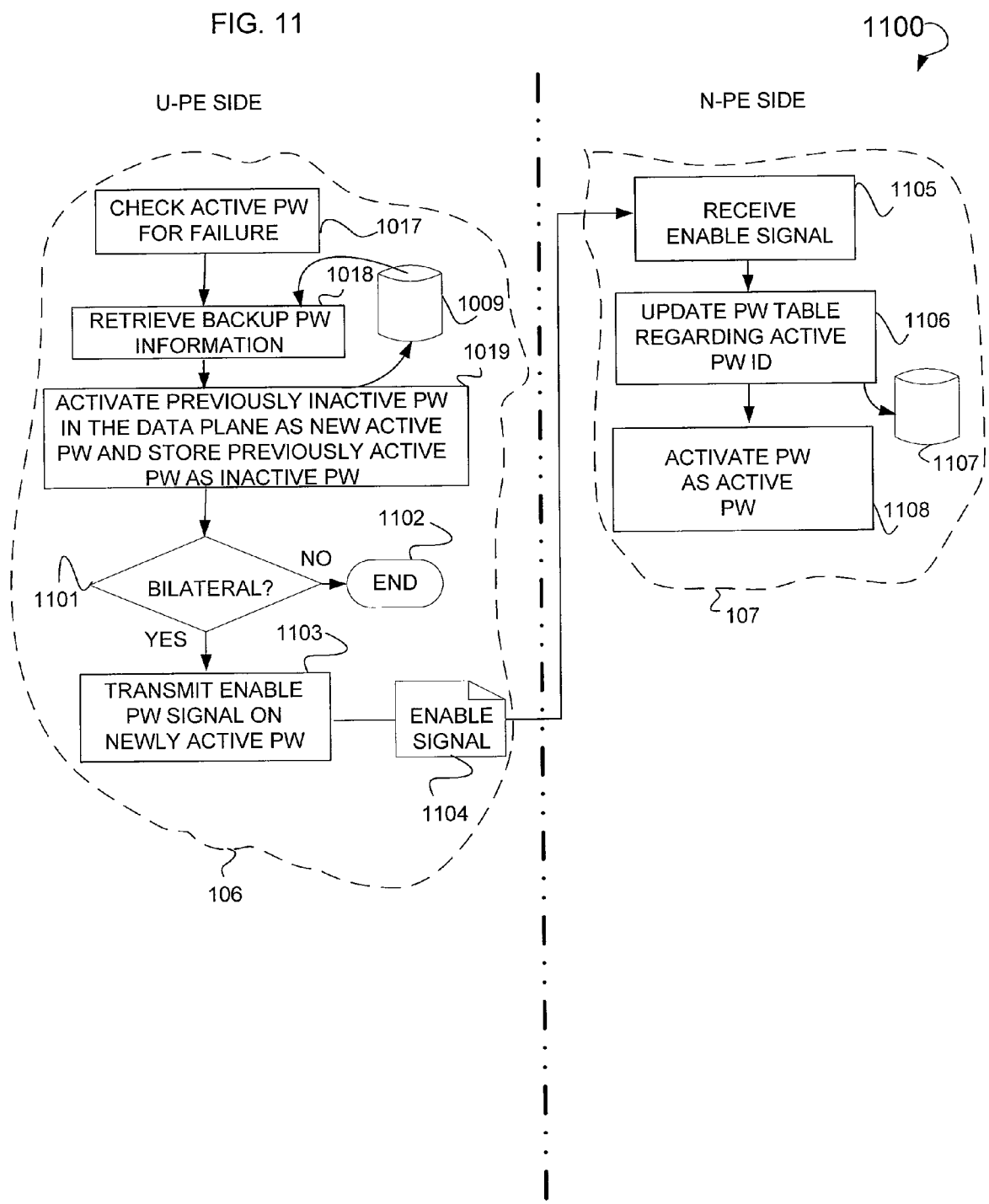
FIG. 11 is a dual-stream flowchart illustrating a method, according to an example embodiment, used to transmit an enable PW signal on a newly active PW.

FIG. 11 is a dual stream flow chart illustrating an example method 1100 used to transmit an enable PW signal on a newly active PW. Contained within the first stream titled "U-PE Side" are the previously illustrated operations 1017-1019, and the database 1009. Added to these various operations are operations 1101-1103. Contained within a second stream titled "N-PE side" are operations 1105-1108, and a database 1107. Shown is a decisional operation 1101 that determines whether bilateral PW disabling is enabled. In examples where decisional operation 1101 evaluates to no (e.g., "false") a termination condition is executed. In cases where decisional operation 1101 evaluates to yes (e.g., "true"), an operation 1103 is executed that generates and transmits an enable PW signal on a newly active PW. This newly active PW may be the new active PW designated in the execution of operation 1019. In certain example cases, the operation 1103 may transmit an enable signal 1104. In certain example cases, an operation 1105 may be executed so as to receive the enable signal 1104. An operation 1106 may be executed to update a PW table that tracks active and inactive PW. In certain example embodiments, active PWs may be tracked or inactive PWs may be tracked. An operation 1108 may be executed to activate, mark, or otherwise flag a certain PW as an active PW.

Figure 12:
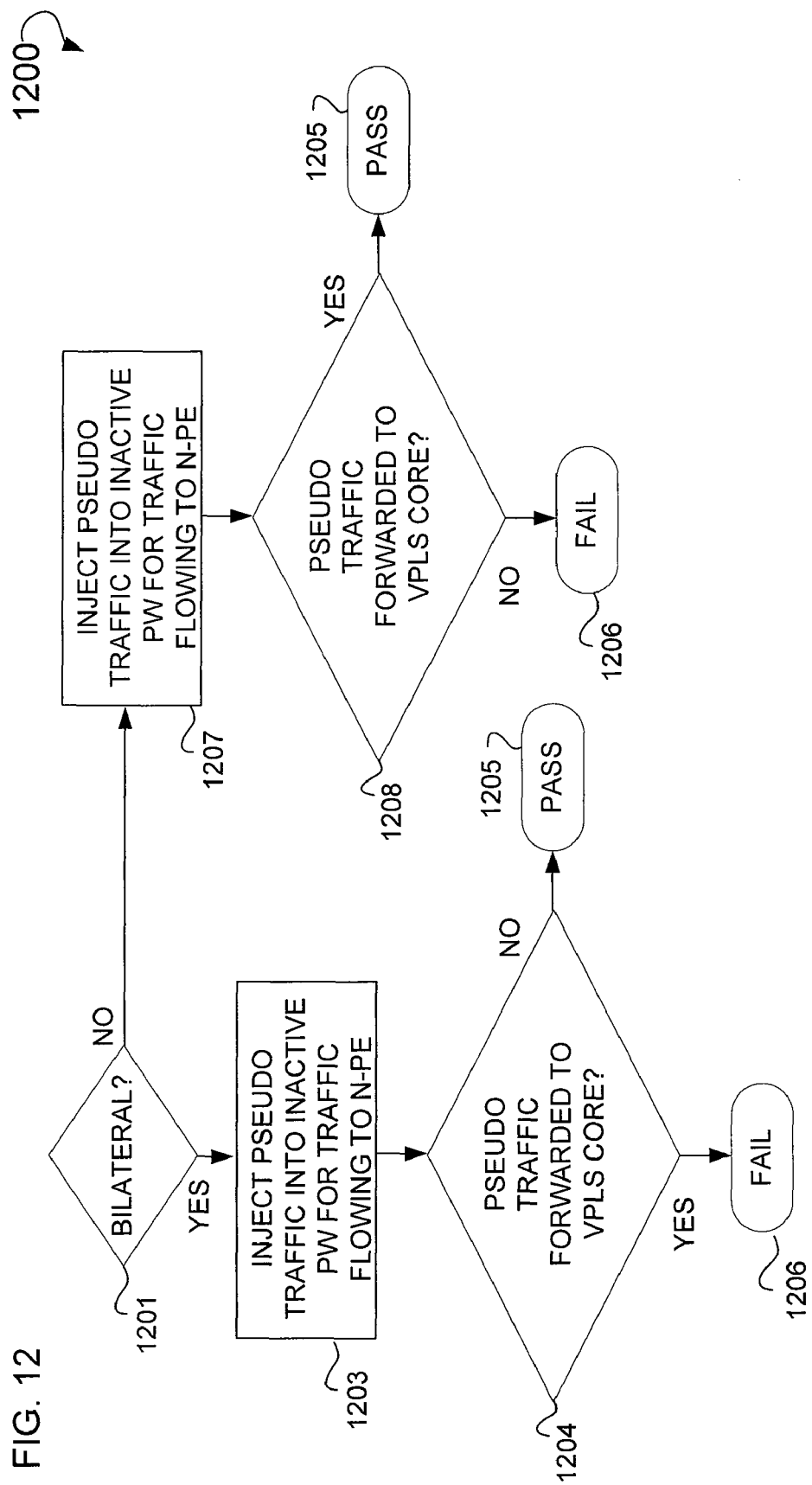
FIG. 12 is a flowchart illustrating a method, according to an example embodiment, used to test a system and method for generating failover between PW.

FIG. 12 is a flowchart illustrating an example method 1200 used to test for a system and method for generating failover between PWs as shown herein between a U-PE to an N-PE. Illustrated is decisional operation 1201 that determines whether or not a flow over a PW is bilateral. In examples where decisional operation 1201 evaluates to yes (e.g., "true"), an operation 1203 is executed that injects pseudo traffic into an inactive PW for traffic flowing to an N-PE. A decisional operation 1204 is executed that determines whether or not the pseudo traffic has been forwarded to, for example, a VPLS core. In example cases where decisional operation 1204 evaluates to no (e.g., "false"), a pass condition 1205 is executed and the process ends. In example cases where decisional operation 1204 evaluates to yes (e.g., "true"), a fail condition 1206 is executed and the process ends.

In example cases where decisional operation 1201 evaluates to no (e.g., "false") an operation 1207 is executed with functionality similar to operation 1203. A decisional operation 1208 may be executed with functionality similar to operation 1204. In examples where decisional operation 1208 evaluates to yes (e.g., "true"), the pass condition 1205 is executed and the process ends. In cases where decisional operation 1208 evaluates to no (e.g., "false"), the fail condition 1206 is executed and the process ends. In certain example embodiments, the execution of the condition 1205 and/or 1206 results in a corresponding pass or fail signal being respectively generated.

Figure 13:
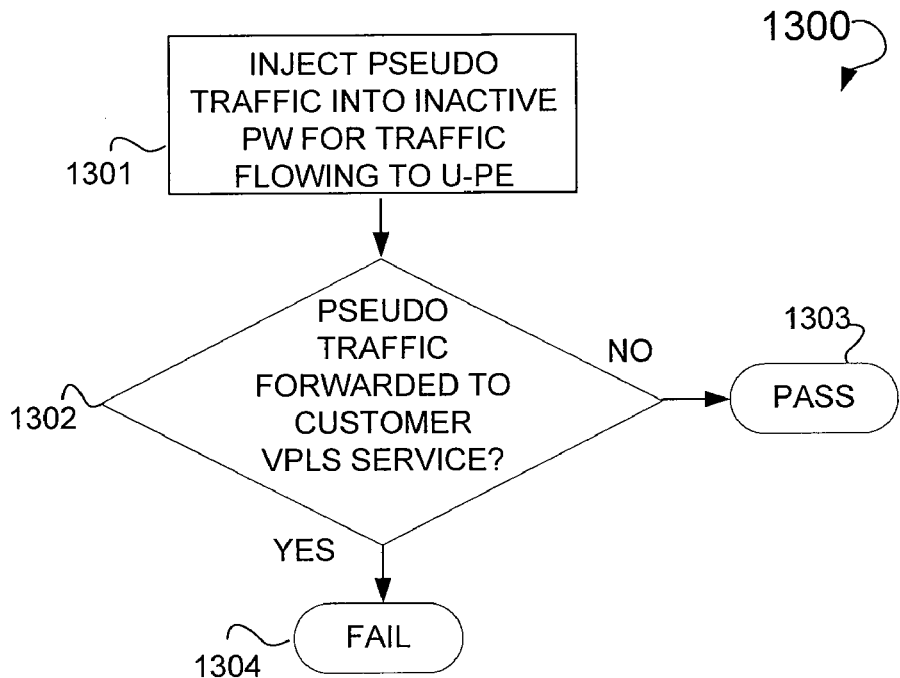
FIG. 13 is a flowchart illustrating a method, according to an example embodiment, used to test a system and method for generating failover between PWs.

FIG. 13 is a flowchart illustrating an example method 1300 used to test for a system and method for generating failover between PWs. Illustrated is an operation 1301 that injects pseudo traffic into an inactive PW for traffic flowing to a U-PE. In some example cases, a decisional operation 1302 is executed that determines whether or not the pseudo traffic has been forwarded to, for example, a customer VPLS service. If operation 1302 evaluates to no (e.g., "false"), a pass condition 1303 is executed and the process ends. In certain example cases, a pass signal may be transmitted as the result of the decisional operation 1302 evaluating to no (e.g., "false"). In example cases where decisional operation 1302 evaluates to yes (e.g., "true"), a fail condition may be met. In certain example cases, a fail signal may be transmitted as a result of the decisional operation 1302 evaluating to yes (e.g., "true").

Figure 14:
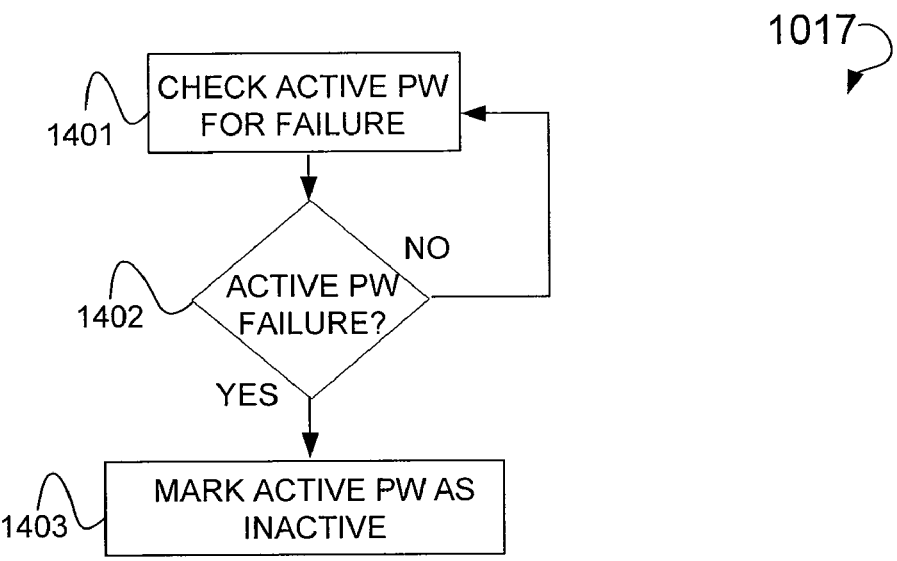
FIG. 14 is a flowchart illustrating a method, according to an example embodiment, used to execute an operation residing on a U-PE and that, when executed, checks for an active PW failure.

FIG. 14 is a flowchart illustrating an example method used to execute operation 1017. Illustrated is an operation 1401 that listens to an active PW. In one embodiment, by checking the active PW, the U-PE 106 may be able to discern when, for example, failure of that active PW occurs. In some examples, the operation 1401 may poll the N-PE via the active PW by sending out a signal to the N-PE and listening for a response. Other ways of detecting a failure of an active PW may include control plane snooping (e.g., listening), detection of a link failure (e.g., a physical failure) where the link is associate with the active PW, and bidirectional forwarding detection. A decisional operation 1402 may be executed that continuously determines whether or not there has been a failure of an active PW. PW failure may be recognized by, for example, not detecting activity (e.g., data transmission) through decisional operation 1402, or not hearing a response to polling by the U-PE along the PW. In some example embodiments, a timing mechanism may be utilized such that if a PW is inactive for a predetermined period of time, then the PW may be deemed to be inactive. In example cases where decisional operation 1402 evaluates to no (e.g., "false"), the operation 1401 is re-executed. In example cases where decisional operation 1402 evaluates to yes (e.g., "true"), an operation 1403 is executed that disables a data plane for an active PW as described elsewhere, and marks the active PW as inactive. This marking may be via flagging the active PW in a database table. Once flagged as inactive, this formerly active PW is stored into a database such as database 1009. This data plane for the active PW may be disabled so as to address any possible problems arising from a loop or a loop condition being created.

Figure 15:
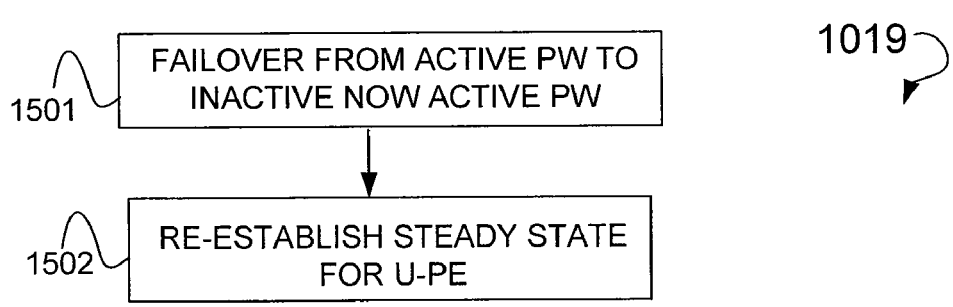
FIG. 15 is a flowchart illustrating a method, according to an example embodiment, used to execute an operation to switch from a formerly active PW to a formerly inactive, now active PW.

FIG. 15 is a flowchart illustrating an example method used to execute operation 1019. Illustrated is an operation 1501 that switches (e.g., failover) from an active PW to an inactive, now new active PW. Once this switch occurs, and the inactive PW becomes an active PW and active PW becomes an inactive PW, an operation 1502 is executed that re-establishes a steady state, for example, for a U-PE such as U-PE 106.

Some example embodiments may utilize the Open Systems Interconnection Basic Reference (OSI) model or Transmission Control Protocol/Internet Protocol (TCP/IP) protocol stack model for defining the protocols used by a network to transmit data. In applying these models, a system of data transmission between a server and client, or between peer computer systems, is illustrated as a series of generally five layers comprising: an application layer, a transport layer, a network layer, a data link layer, and a physical layer. In the case of software that has a three-tier architecture, the various tiers (i.e., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is then loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some example cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Figure 16:
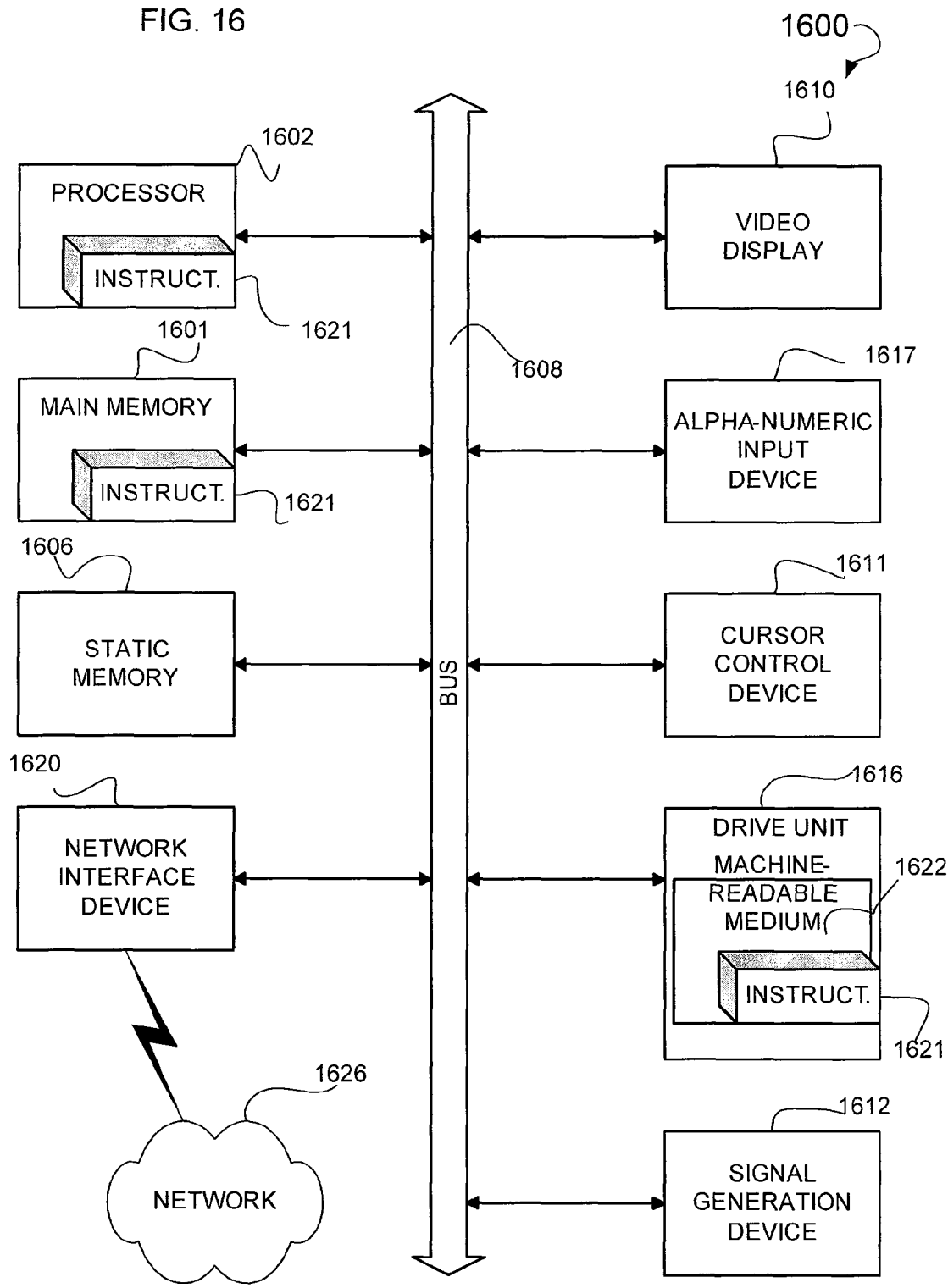
FIG. 16 shows a diagrammatic representation of a machine, according to an example embodiment, in the form of a computer system.

FIG. 16 shows a diagrammatic representation of machine in the example form of a computer system 1600 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a Central Processing Unit (CPU), a Graphics Processing Unit (GPU) or both), a main memory 1601 and a static memory 1606, which communicate with each other via a bus 1608. The computer system 1600 may further include a video display unit 1610 (e.g., a LCD or a CRT). The computer system 1600 also includes an alphanumeric input device 1617 (e.g., a keyboard), a user interface (UI) cursor controller 1611 (e.g., a mouse), a disk drive unit 1616, a signal generation device 1614 (e.g., a speaker) and a network interface device (e.g., a transmitter) 1620.

The disk drive unit 1616 includes a machine-readable medium 1622 on which is stored one or more sets of instructions and data structures (e.g., software) 1621 embodying or utilized by any one or more of the methodologies or functions illustrated herein. The software may also reside, completely or at least partially, within the main memory 1601 and/or within the processor 1602 during execution thereof by the computer system 1600, the main memory 1601 and the processor 1602 also constituting machine-readable media.

The instructions 1621 may further be transmitted or received over a network 1626 via the network interface device 1620 using any one of a number of well-known transfer protocols (e.g., Hyper-Text Transfer Protocol (HTTP), Session Initiation Protocol (SIP)).

While the machine-readable medium 1622 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that cause the machine to perform any one or more of the methodologies of the present method and apparatus, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

In some example embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or even source code.

As shown herein, and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device where internal modules (e.g., a processor and memory) work together to perform operations on electronic data.

In some example embodiments, the method and apparatus may be practiced in network computing environments with many types of computer system configurations, including hubs, routers, wireless Access Points (APs), wireless stations, personal computers, laptop computers, multi-processor systems, microprocessor-based or programmable consumer electronics, network PCs, minicomputers, mainframe computers, and the like. The method and apparatus can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices (see below).

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    using a setup engine, establishing a plurality of Pseudo Wire (PW) connections between a first network appliance region and a second network appliance region to transmit data from the first network appliance region to the second network appliance region along an active PW;
    disabling the active PW when a failure of the active PW is detected;
    using a selector, selecting an inactive PW to become a new active PW such that the data is transmittable via the new active PW from the first network appliance region to the second network appliance region; and
    using a PW switch, switching from the active PW to the new active PW.

2. The method of claim 1, further comprising listening to the active PW.

3. The method of claim 2, wherein the listening to the active PW comprises:
    polling the second network appliance; and
    detecting a response to the polling.

4. The method of claim 1, further comprising storing the active PW into a data store as another inactive PW.

5. The method of claim 1, further comprising enabling a selected inactive PW in a data plane.

6. An apparatus comprising:
    a setup engine to establish a plurality of Pseudo Wire (PW) connections between a first network appliance region and a second network appliance region to transmit data from the first network appliance region to the second network appliance region along an active PW;
    a disabling signal transmitter to transmit a disable PW signal when a failure of the active PW is detected;
    a selector to select an inactive PW to become a new active PW such that the data is transmittable via the new active PW from the first network appliance region to the second network appliance region; and
    a PW switch to switch from the active PW to the new active PW, the new active PW providing a new data plane across which the data may be transmitted.

7. The apparatus of claim 6, further comprising a listening engine to listen to the active PW.

8. The apparatus of claim 7, wherein the listening engine to listen to the active PW, monitors activity on the active PW.

9. The apparatus of claim 7, wherein the listening engine listens to the active PW and comprises:
    polling the second network appliance; and
    detecting a response to the polling.

10. The apparatus of claim 6, further comprising a storage engine to store the active PW into a data store as another inactive PW.

11. The apparatus of claim 6, wherein the apparatus is part of a core network that includes at least one of the first network appliance region and the second network appliance region.

12. The apparatus of claim 6, further comprising:
    a determining engine to determine whether bilateral PW disabling is supported by at least one of the first network appliance, or the second network appliance;
    a first transmitter to transmit a disable signal from the first network appliance to the second network appliance to instruct the second network appliance as to an identity of an inactive PW; and
    a receiver to receive a data transmission across an active PW, the data transmission being sent from the second network appliance to the first network appliance.

13. The apparatus of claim 12, further comprising a second transmitter to transmit a PW enable signal from the first network appliance to the second network appliance when the inactive PW is being transitioned to become the active PW.

14. The apparatus of claim 12, further comprising an update engine to update the second network appliance on the identity of the inactive PW.

15. The apparatus of claim 12, further comprising a switch to use the first network appliance to switch from a first active PW to a second active PW, the second active PW being formerly the inactive PW.

16. The apparatus of claim 12, further comprising a marking engine to mark the inactive PW.

17. The apparatus of claim 12, further comprising an enabling engine to enable a selected inactive PW in a data plane.

18. An apparatus comprising:
- means for establishing a plurality of Pseudo Wire (PW) connections between a first network appliance region and a second network appliance region to transmit data from the first network appliance region to the second network appliance region along an active PW;
- means for disabling the active PW when a failure of the active PW is detected;
- means for selecting an inactive PW to become a new active PW such that the data is transmittable via the new active PW from the first network appliance region to the second network appliance region; and
- means for switching from the active PW to the new active PW.

19. An apparatus comprising:
- at least one processor;
- a memory in communication with the at least one processor, the memory including logic encoded in one or more tangible media for execution and when executed operable to:
  - establish a plurality of Pseudo Wire (PW) connections between a first network appliance region and a second network appliance region to transmit data from the first network appliance region to the second network appliance region along an active PW;
  - disable the active PW when a failure of the active PW is detected;
  - selecting an inactive PW to become a new active PW such that the data is transmittable via the new active PW from the first network appliance region to the second network appliance region; and
  - switch from the active PW to the new active PW.

20. Logic encoded in one or more non-transitory tangible media for execution and when executed operable to:
- establish a plurality of Pseudo Wire (PW) connections between a first network appliance region and a second network appliance region to transmit data from the first network appliance region to the second network appliance region along an active PW;
- disable the active PW when a failure of the active PW is detected;
- select an inactive PW to become a new active PW such that the data is transmittable via the new active PW from the first network appliance region to the second network appliance region; and
- switching from the active PW to the new active PW.

* * * * *